United States Patent
Juliusson et al.

(10) Patent No.: US 12,519,403 B2
(45) Date of Patent: Jan. 6, 2026

(54) VARIABLE PWM FREQUENCY RESPONSIVE TO POWER INCREASE EVENT IN WELDING SYSTEM

(71) Applicant: ESAB AB, Gothenburg (SE)

(72) Inventors: David Juliusson, Gothenburg (SE); Magnus Persson, Kyrkesund (SE)

(73) Assignee: ESAB AB, Gothenburg (SE)

( * ) Notice: Subject to any disclaimer, the term of this patent is extended or adjusted under 35 U.S.C. 154(b) by 976 days.

(21) Appl. No.: 17/687,787

(22) Filed: Mar. 7, 2022

(65) Prior Publication Data

US 2023/0283200 A1   Sep. 7, 2023

(51) Int. Cl.
*H02M 7/5387* (2007.01)
*B23K 9/09* (2006.01)
*H02M 1/08* (2006.01)

(52) U.S. Cl.
CPC .......... *H02M 7/5387* (2013.01); *B23K 9/092* (2013.01); *H02M 1/08* (2013.01)

(58) Field of Classification Search
CPC ........ B23K 9/067; B23K 9/092; B23K 9/093; B23K 9/0953; B23K 9/0956; B23K 9/1006; H02M 7/5387; H02M 1/08
See application file for complete search history.

(56) References Cited

U.S. PATENT DOCUMENTS

| | | | |
|---|---|---|---|
| 4,301,355 A | 11/1981 | Kimbrough et al. | |
| 4,403,135 A | 9/1983 | Moyer et al. | |
| 4,475,028 A | 10/1984 | McGuire, Jr. et al. | |
| 7,205,503 B2 | 4/2007 | Reynolds et al. | |
| 7,714,252 B2 | 5/2010 | Casner et al. | |
| 9,929,663 B1 * | 3/2018 | Babazadeh | H02M 3/33592 |
| 10,828,714 B1 | 11/2020 | Cox et al. | |
| 11,031,862 B2 | 6/2021 | Manthe et al. | |
| 11,482,923 B1 * | 10/2022 | Meyer, III | H02M 1/327 |
| 2005/0276085 A1 | 12/2005 | Winn | |
| 2018/0304393 A1 | 10/2018 | Vogel et al. | |
| 2021/0060679 A1 | 3/2021 | Liu et al. | |
| 2021/0129250 A1 * | 5/2021 | Vogel | B23K 9/0735 |

FOREIGN PATENT DOCUMENTS

GB    2144594 A    3/1985

OTHER PUBLICATIONS

Notification of Transmittal of International Search Report and Written Opinion including International Search Report and Written Opinion for International Patent Application No. PCT/IB2023/051956 dated Jul. 7, 2023, 14 pages.

* cited by examiner

*Primary Examiner* — Brian W Jennison
(74) *Attorney, Agent, or Firm* — Edell, Shapiro & Finnan, LLC

(57) ABSTRACT

A method is performed in a welding or cutting system having a power inverter to generate an alternating current (AC) signal responsive to pulse width modulation (PWM) that is applied to the power inverter to control the AC signal. The method includes: upon detecting a power increase event in the welding or cutting system that necessitates an increase in the AC signal, controlling the PWM to cause the power inverter to increase the AC signal over multiple PWM cycles by: generating a first PWM cycle having a first period and a first on-time corresponding to a first duty cycle of the first PWM cycle that is greater than 50%; and generating a second PWM cycle having a second period that is greater than the first period and a second on-time corresponding to a second duty cycle of the second PWM cycle that is greater than 50%.

18 Claims, 9 Drawing Sheets

800

Controlling power inverter with initial PWM to generate
initial PWM cycles having initial frequency, period,
and on-times/pulses (produces voltage
pulses and supplies current when in current mode) — 802

Upon detecting weld start while generating
initial voltage pulses, controlling PWM to cause
power inverter to ramp-up AC current (to ramp-up
weld current) for welding operation over multiple PWM
cycles so as to maintain current and magnetization
balance in transformer. Includes (i) generating first PWM
cycle having first period and first on-time/pulse width
corresponding to first duty cycle (of first PWM cycle) > 50%,
and (ii) generating second PWM cycle having second
period > first period and second on-time (> first on-time)
corresponding to second duty cycle (of second PWM) > 50% — 804

FIG.8

VARIABLE PWM FREQUENCY RESPONSIVE TO POWER INCREASE EVENT IN WELDING SYSTEM

TECHNICAL FIELD

The present disclosure relates to ramping-up weld current for a welding or cutting operation in a welding system.

BACKGROUND

Inverter-based welding and cutting power supplies typically control the power in a welding operation by dynamically adjusting the pulse width modulation (PWM) of a power inverter based on feedback indicating the arc voltage or the like during a welding/cutting operation. The power inverter comprises a set of high-speed semiconductor switching devices (e.g., insulated-gate bipolar transistors (IGBTs)) that are switched on and off at a switching frequency according to the PWM to create an alternating current (AC) waveform that is supplied to an output transformer. The output transformer converts the voltage and current of the input AC signal to desired voltage and current levels for the welding/cutting operation. The resulting AC signal generated by the output transformer is then rectified to supply weld power to the weld output for the welding operation.

The on-time (i.e., pulse width) and duty cycle of the power inverter switches is controlled by a controller based on a desired welding voltage/current waveform and feedback from the actual welding conditions (e.g., measured arc voltage). Increasing the pulse width and duty cycle of the switching waveform controlling the inverter increases the weld power.

To achieve good weld starts, a fast weld current ramp-up is desirable. Specifically, weld current should be increased as rapidly as possible to strike an arc. Similarly, after weld start, welding conditions may necessitate a fast weld current ramp-up to maintain a desired level of weld current during the ongoing welding or cutting operation; however, power electronics in the power supply may be harmed if the magnetization of the output transformer is not in balance (skewed). Thus, for certain events before and during a welding or cutting operation, the weld current should be ramped up quickly without overloading one side of the transformer. One solution is to "over engineer" the transformer to handle the transient start-up conditions, but this adds considerable cost/weight/complexity to the overall power supply design.

BRIEF DESCRIPTION OF THE DRAWINGS

FIG. 8 is a flowchart of a method performed in a welding or cutting system to ramp-up weld current in response to a power increase event, according an example embodiment.

DESCRIPTION OF EXAMPLE EMBODIMENTS

Overview

In an embodiment, a method is performed in a welding or cutting system having a power inverter to generate an alternating current (AC) signal responsive to pulse width modulation (PWM) that is applied to the power inverter to control the AC signal. The method includes: upon detecting a power increase event in the welding or cutting system that necessitates an increase in the AC signal, controlling the PWM to cause the power inverter to increase the AC signal over multiple PWM cycles by: generating a first PWM cycle having a first period and a first on-time corresponding to a first duty cycle of the first PWM cycle that is greater than 50%; and generating a second PWM cycle having a second period that is greater than the first period and a second on-time corresponding to a second duty cycle of the second PWM cycle that is greater than 50%. The second on-time may be greater than the first on-time. The first duty cycle and the second duty cycle may each be 100%.

Example Embodiments

Figure 1:
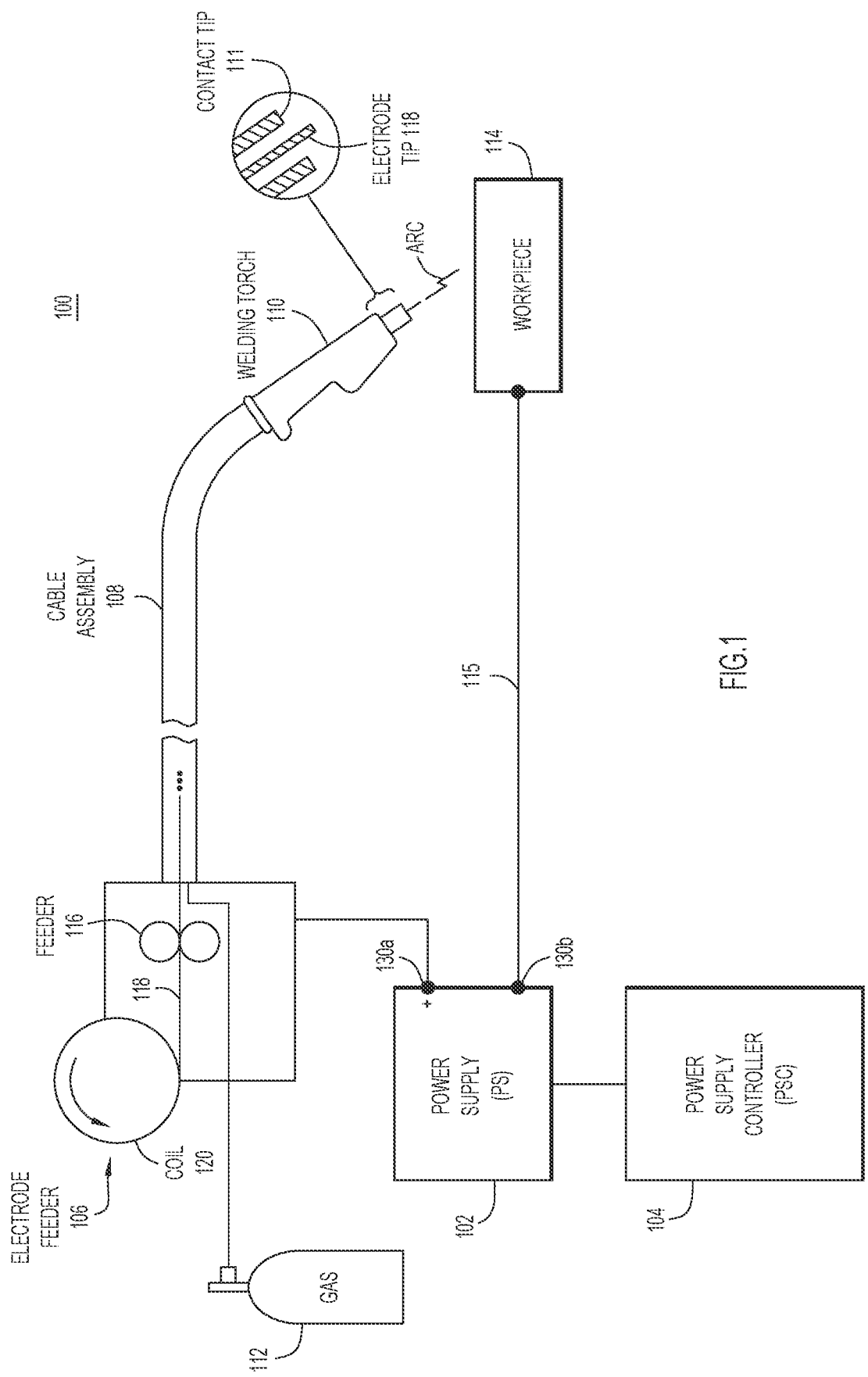
FIG. 1 is an illustration of a welding system, according to an example embodiment.

With reference to FIG. 1, there is an illustration of an example metal inert gas (MIG)/metal active gas (MAG) welding system 100, in which embodiments directed to ramping-up weld current for a welding or cutting operation may be implemented. The embodiments are presented in the context of MIG/MAG welding by way of example only. It is understood that the embodiments may be employed generally in any know or hereafter developed welding environments, such as, but not limited to, tungsten inert gas (TIG) welding, flux cored arc welding (FCAW), shielded metal arc welding (SMAW) or stick welding, submerged arc welding (SAW), and so on. Additionally, the embodiments may be employed equally in an arc cutting apparatus. Welding system 100 includes: a power supply 102; a power supply controller (PSC) 104 coupled to and configured to control the power supply; an electrode feeder 106 coupled to the power supply; a cable assembly 108 coupled to the electrode feeder; a welding gun or torch 110 coupled to the cable assembly and having a sturdy metal contact tip 111 that extends from an end of the welding gun or torch; a gas container 112 coupled to the cable assembly; and a workpiece 114 coupled to the power supply through at least a return path/cable 115. In the ensuing description, the terms "weld" and "welding" are synonymous and interchangeable. Also, the terms "weld" and "welding" refer broadly to both welding and plasma cutting systems and operations.

Electrode feeder 106 includes a feeder 116 to feed an electrode 118 from a coiled electrode 120 through cable assembly 108 and through contact tip 111 of welding torch 110, which is in electrical contact with the electrode. Under control of PSC 104, power supply 102 generates weld power that drives the welding process/operation. In welding operations that involve a pulsed or periodic waveform, the weld power typically includes a series of weld current pulses. Power supply 102 provides the weld power from an output terminal 130a of the power supply to electrode 118, through electrode feeder 116, cable assembly 108, and welding torch 110, while the cable assembly also delivers a shielding gas from gas container 112 to the welding torch.

During a welding operation, electrode tip 118 of welding torch 110 is brought into contact or near contact with workpiece 114, and the weld power (i.e., current and voltage) supplied by power supply 102 to the welding torch creates an arc between workpiece 114 and a tip of electrode 118 (referred to as an "electrode tip" or an "electrode stick") extending through the contact tip. To control the welding process, PSC 104 controls power supply 102 to generate the weld power (e.g., current) at a desired level for the welding process, based on feedback in the form of measurements of the current and voltage (e.g., arc voltage) supplied by the power supply to the welding process. The measurements may be produced by current and voltage sense points in power supply 102 and/or at sense points that are remote from the power supply, such as in cable assembly 108 or torch 110.

Figure 2:
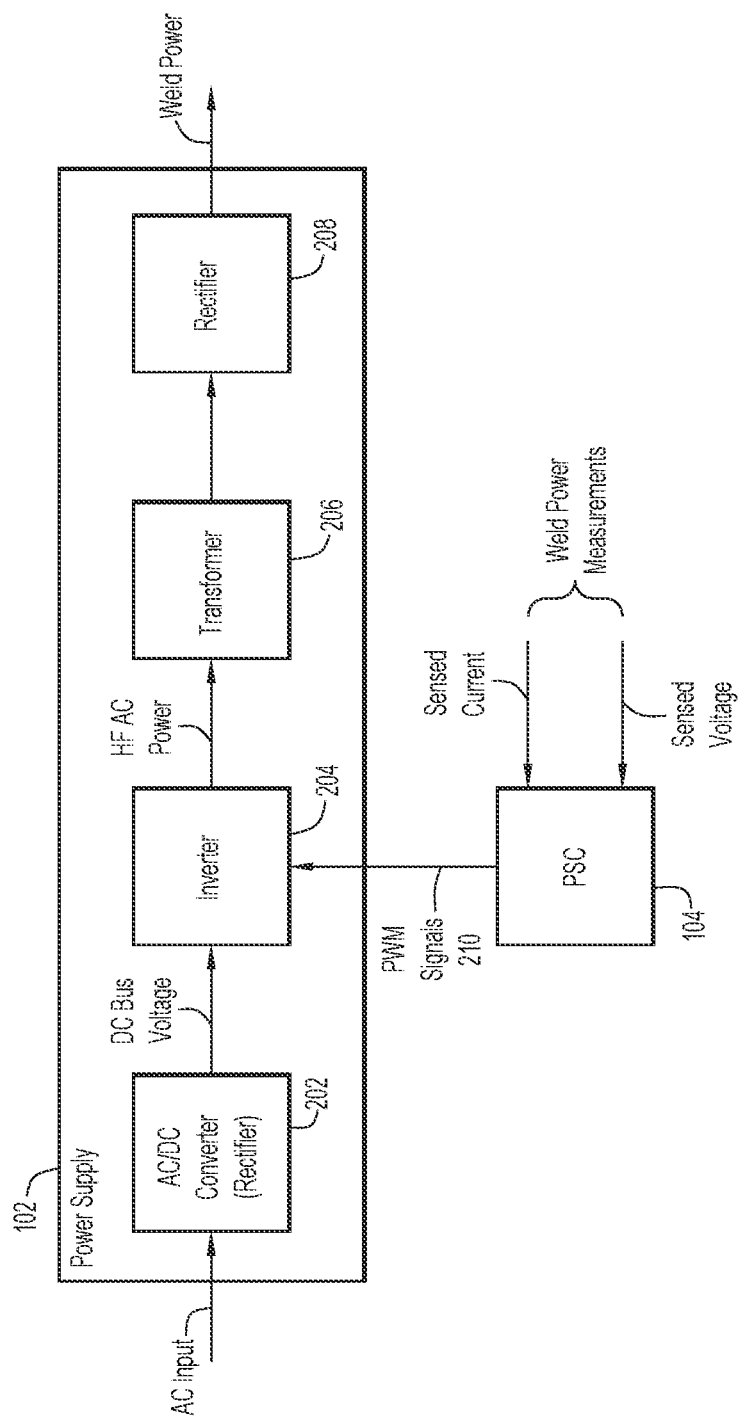
FIG. 2 is a block diagram of a power supply and power supply controller (PSC) of the welding system, according to an example embodiment.

FIG. 2 is a block diagram of power supply 102 with PSC 104, according to an embodiment. Power supply 102 includes an AC/DC converter 202 to receive AC input power (e.g., from AC mains or a generator), a power inverter (referred to simply as an "inverter") 204, a high-frequency transformer 206, and a rectifier 208 coupled to one another. AC/DC converter 202 includes a diode rectifier to convert the AC input power to a constant, rectified DC voltage (also referred to as a DC "bus" voltage), and provide the DC bus voltage to an input of inverter 204. Under control of PSC 104, inverter 204, transformer 206, and rectifier 208 collectively operate as a weld process regulator to convert the DC bus voltage to a desired weld power supplied by power supply 102 for a welding operation.

Inverter 204 (e.g., an H-bridge inverter) comprises a set of high-speed semiconductor switching devices (i.e., power switches) that are pulse width modulated (i.e., switched on and off at a switching frequency) responsive to pulse width modulation (PWM) signals or waveforms 210 generated by PSC 104 and applied to control terminals of the switching devices, to convert the DC bus voltage to an AC (power) signal or waveform including voltage and current. Example switching frequencies may be in a range from 1 kHz-100 kHz, although other switching frequencies above and below this range may be used. PWM waveforms 210 control a PWM frequency (i.e., the switching frequency) (and, correspondingly, period), duty cycle, and on-time of inverter 204, and thus the frequency, period, duty cycle, and magnitude of the AC signal (also referred to as an "AC waveform") generated by inverter 204. Such operation is referred to as "PWM operation" (or simply "PWM") of inverter 204. Inverter 204 supplies the AC signal to transformer 206. Transformer 206 converts the voltage and current of the AC signal from inverter 204 to a transformed AC signal having desired levels of voltage and current for the welding operation, and supplies the transformed AC signal to rectifier 208. Rectifier 208 rectifies the transformed AC signal to produce the weld power and supplies the weld power to the welding process.

PSC 104 receives the above-mentioned current and voltage (e.g., arc voltage) measurements that provide real-time feedback from the welding process. In some arrangements, control logic of power supply 102 also receives the current voltage measurements, directly. To control the weld power generated by power supply 102, PSC 104 controls or dynamically adjusts the PWM of/applied to inverter 204 based on a desired voltage/current waveform for the weld power, and based on the current and/or voltage measurements from the welding process. An increase in the duty cycle and on-time of inverter 204 results in a corresponding increase in the weld power, and vice versa. The PWM (i.e., PWM waveform) includes a sequence of "PWM cycles" and is defined in terms of various parameters of the PWM cycles. A PWM cycle (also referred to simply as a "cycle") may be defined in terms of its frequency, period, duty cycle, and on-time or pulse width of a pulse that occurs in the PWM cycle. The period (i.e., a pulse repetition interval) of the PWM cycle is the inverse of its frequency (i.e., period=1/frequency), and may be computed as a time between rising edges of successive "on-times" or "pulses" of successive PWM cycles. The duty cycle is a percentage of the on-time over one cycle (i.e., that occurs during the period). For example, the duty cycle may be computed as a ratio of (i) the on-time in one cycle, to (ii) the period. The "on-time" is that portion of the PWM cycle (e.g., a voltage state, such as a logic high voltage) that energizes the power supply, as described further below. Depending on context, the term "on-time" can mean a "pulse" and/or a "pulse width" of the pulse in a PWM cycle. For example, the "on-time" during the PWM cycle produces/represents a "pulse" having a "pulse width" equal to the on-time.

Figure 3:
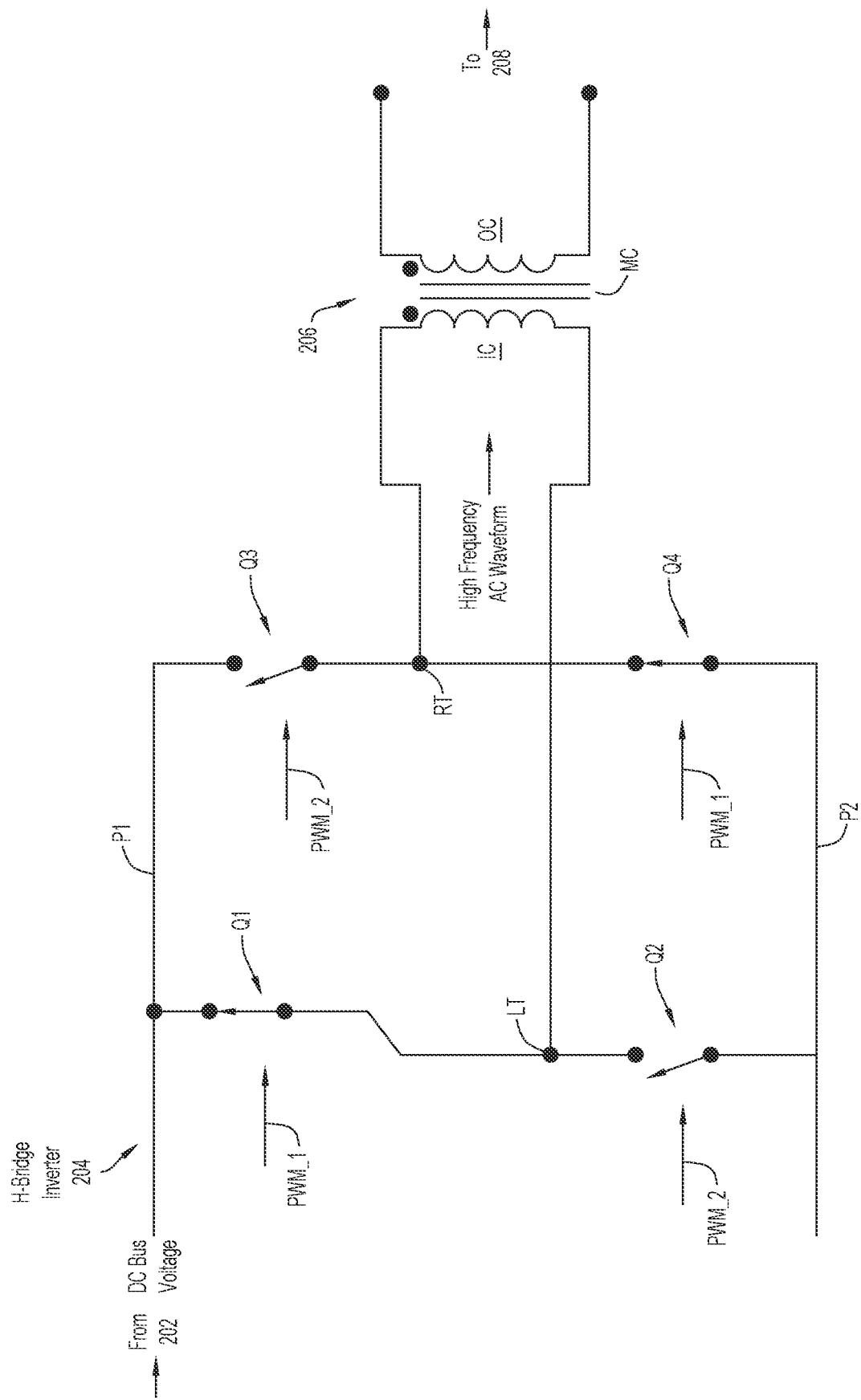
FIG. 3 is a circuit diagram of a power inverter and a transformer of the power supply, according to an example embodiment.

FIG. 3 is a simplified circuit diagram of inverter 204 and transformer 206. Transformer 206 includes an input coil IC coupled to an output of inverter 204, an output coil OC coupled to an input of rectifier 208 and electrically isolated from the input coil, and a magnetic core MC configured to magnetically couple the input coil IC to the output coil OC.

Inverter 204 includes a four-quadrant inverter, such as an H-bridge inverter, for example. Inverter 204 includes input voltage rails P1 and P2 to receive the DC bus voltage generated by AC/DC converter 202, and also includes a set of high-frequency semiconductor (current) switches Q1-Q4 (more generally referred to as "power switches" or simply "switches") coupled to the input voltage rails and arranged in an H configuration. In an example, switches Q1, Q2, Q3, and Q4 correspond to first, second, third, and fourth quadrants of the four-quadrant inverter. More specifically, inverter 204 includes (i) upper left switch Q1 and lower left switch Q2 connected in series with each other between input voltage rails P1 and P2 to form a first/left leg of the inverter, and (ii) upper right switch Q3 and lower right switch Q4 connected in series with each other between the input voltage rails to form a second/right leg of the inverter. Switches Q1 and Q2 are connected to each other at a left terminal LT, and switches Q3 and Q4 are connected to each other at a right terminal RT. Terminals LT, RT are respectively connected to opposing sides of input coil IC of transformer 206, while opposing sides of output coil OC of the transformer are coupled to rectifier 208. Switches Q1-Q4 (more generally, the first through the fourth quadrants) are controlled (i.e., turned ON or closed and turned OFF or opened) responsive to PWM signals or waveforms 210 generated by PSC 104 and applied to respective control terminals of the switches. PWM waveforms 210 are typically configured as periodic square wave pulses, although other waveforms are possible.

In the example of FIG. 3, PWM waveforms 210 include PWM waveforms PWM_1 and PWM_2 (referred to simply as "PWM_1" and "PWM_2"), which respectively control first diagonal switch pair Q1, Q4 (e.g., the diagonal first and fourth quadrants) (together) and second diagonal switch pair Q2, Q3 (e.g., the diagonal second and third quadrants) (together). ON/OFF (e.g., high/low) states of PWM_1 (or PWM_2) turn ON/OFF first diagonal switch pair Q1, Q4 (or second diagonal switch pair Q2, Q3) to supply/not supply current from input voltage rails (P1, P2) to input coil IC of transformer 206 through left terminal LT (or through right terminal RT). In general, PWM_1 and PWM_2 alternately turn ON and OFF with respect to each other to alternately energize and de-energize diagonal switch pairs Q1, Q4 (e.g., the diagonal first and fourth quadrants) and Q2, Q3 (e.g., the diagonal second and third quadrants) to supply current to input coil IC of transformer 206 alternately via terminals LT and RT. During each on-time (i.e., pulse) of PWM_1, and during each on-time of PWM_2, inverter 204 supplies current to transformer 206. The example of FIG. 3 shows a PWM cycle in which switches Q1, Q4 are ON responsive to PWM_1, and switches Q2, Q3 are OFF responsive to PWM_2, in which case only terminal LT supplies current to transformer 206. A subsequent PWM cycle reverses the configuration. PSC 104 controls the PWM frequency, period, duty cycle, and on-time of each of PWM waveforms PWM_1 and PWM_2 to control an overall or composite PWM frequency, period, duty cycle, and on-time of the current supplied to transformer 206. The magnitude and frequency of the AC signal generated by inverter 204, and correspondingly the magnitude and frequency of the current and voltage of the weld power produced by power supply 102, is controlled responsive to the PWM waveforms.

In an example, each switch Qi may be implemented as a switching transistor, such as an insulated gate bipolar transistor (IGBT) having an emitter-collector current path that is turned ON or OFF responsive to a voltage applied to a gate (i.e., the control terminal) of the IGBT, for example. Alternatively, each switch Qi may be implemented as a field effect transistor (FET) (e.g., a metal oxide semiconductor (MOS) FET (MOSFET)) having a source-drain current path that is turned ON or OFF responsive to a voltage applied to a gate of the FET, for example. Each switch Qi may also include an internal diode that is connected in parallel with the controlled current path of the switch. Other types of power switches may be used, as would be appreciated by one of ordinary skill in the relevant arts.

Returning to FIG. 1, an operator may perform welding of workpiece 114 in multiple stages. In a pre-welding stage, while the operator holds welding torch 110 in a position that is separated from workpiece 114 so that the welding torch is not in physical or electrical contact with workpiece 114, there is an open circuit between output terminals 130a, 130b of power supply 102. The open circuit prevents weld current (of the weld power) from flowing to welding torch 110, i.e., the weld current is zero. During the pre-welding stage, PSC 104 may control inverter 204 to operate in an idle state or "voltage mode" to generate an idle voltage having a relatively low duty cycle (e.g., idle state duty cycle <<100%), and which appears as an open circuit voltage at contact tip 111 of welding torch 110. In the idle state, inverter 204 does not supply any significant amount of AC current.

In a next stage, the welding torch 110 is brought sufficiently near to or into contact with workpiece 114 to strike an arc to begin a welding or cutting operation on the workpiece. The act of bringing welding torch 110 into contact with workpiece 114 is referred to as "weld start." At weld start, initial/momentary contact between welding torch 110 and workpiece 114 closes the circuit between output terminals 130a, 130b, which results in a marked voltage dip in the idle voltage. At weld start, a fast ramp-up of weld current (of the weld power) is desirable. Specifically, inverter 204 should be controlled to increase the level of the AC signal produced by the inverter, and thus to increase the weld current correspondingly, as rapidly as possible to strike an arc between electrode 118 and workpiece 114. Thus, the weld current at weld start should have a sharp "current knee," i.e., a high second time derivative of the current (d2i/dt2). Weld start is an example of a "power increase event" in welding system 100.

A power increase event is an operational event or condition in welding system 100 that, when detected, triggers a ramp-up of the weld power as rapidly as possible. In other words, the power increase event is an operational event or condition in welding system 100 that necessitates the ramp-up in the weld power as rapidly as possible. As used herein, the term "ramp-up" is synonymous with and may be used interchangeably with the term "increase." The power increase event may occur before a welding operation (as in the case of weld start) or during a welding operation. Because the weld power varies with the AC signal generated by inverter 204, it follows that the power increase event triggers or necessitates a ramp-up of the AC signal to produce the ramp-up of the weld power. The ramp-up in weld power may include an increase in weld current from a few amps to tens of amps, for example, although other levels of increase in the weld current are possible, depending on welding conditions.

Another example of a power increase event includes a command issued by PSC 104 to inverter 204 to increase the weld power. The command may comprise a command to increase the weld current/AC signal over a specified time period, for example. Yet another example of a power increase event includes any change in a state of welding system 100 during a welding operation (e.g., while welding system 100 operates in a current mode to supply weld current to the welding operation) that necessitates a ramp-up of the weld power. The change in state may be a rapid drop in the weld current that occurs when a droplet is detaching or detaches, which necessitates a ramp-up of the weld current to counteract the actual (or expected) drop in the weld current. Additionally, the change in state may be a sudden drop in voltage caused by a short circuit. The sensed current/voltage may indicate the change in state to PSC 104 or to power supply 102 directly in an embodiment in which power supply 102 also receives the sensed current/voltage.

Whichever power increase event initiates a rapid increase in the current generated by inverter 204 (to produce the corresponding rapid increase in the weld current), the rapid increase can saturate and possibly harm transformer 206 or other power electronics if magnetization current in the coils/core of the transformer caused by the rapid increase is not balanced, i.e., is skewed. Thus, it is desirable to ramp-up the weld current as quickly as possible without saturating the core of transformer 206. One solution is to "over engineer" the transformer to handle or tolerate the transient current increase, but this adds considerable cost/weight/complexity to overall power supply.

Accordingly, embodiments presented herein detect a power increase event that necessitates a rapid and substantial ramp-up of the AC signal generated by power inverter 204. In response to the power increase event, the embodiments control the ramp-up of the AC signal to satisfy the power increase event, while maintaining a balanced magnetization current in transformer 206. By way of example, the embodiments are described in detail below using weld start as the power increase event; however, it is understood that the embodiments apply equally to ramping-up of the AC signal responsive to any type of power increase event. In other words, the embodiments may similarly control the ramp-up of the AC signal in response to weld start, a command to increase the weld power/AC signal, or a change in state of welding during a welding operation, for example.

In the ensuing description, the "AC signal" generated by inverter 204 responsive to a PWM waveform and the "weld current" may be referred to interchangeably and synonymously unless other indicated, because the "weld current" results from the "AC signal." For example, a ramp-up in weld current is achieved by a ramp-up in a level of the AC signal produce by inverter 204. Also, for convenience, the "AC signal" generated by inverter 204 may be referred to herein simply as "AC" or "current." Additionally, the terms "weld current" and "weld power" may be considered as synonymous and used interchangeably depending on the context of their use, as would be understood by one of ordinary skill in the relevant arts.

Figure 4:
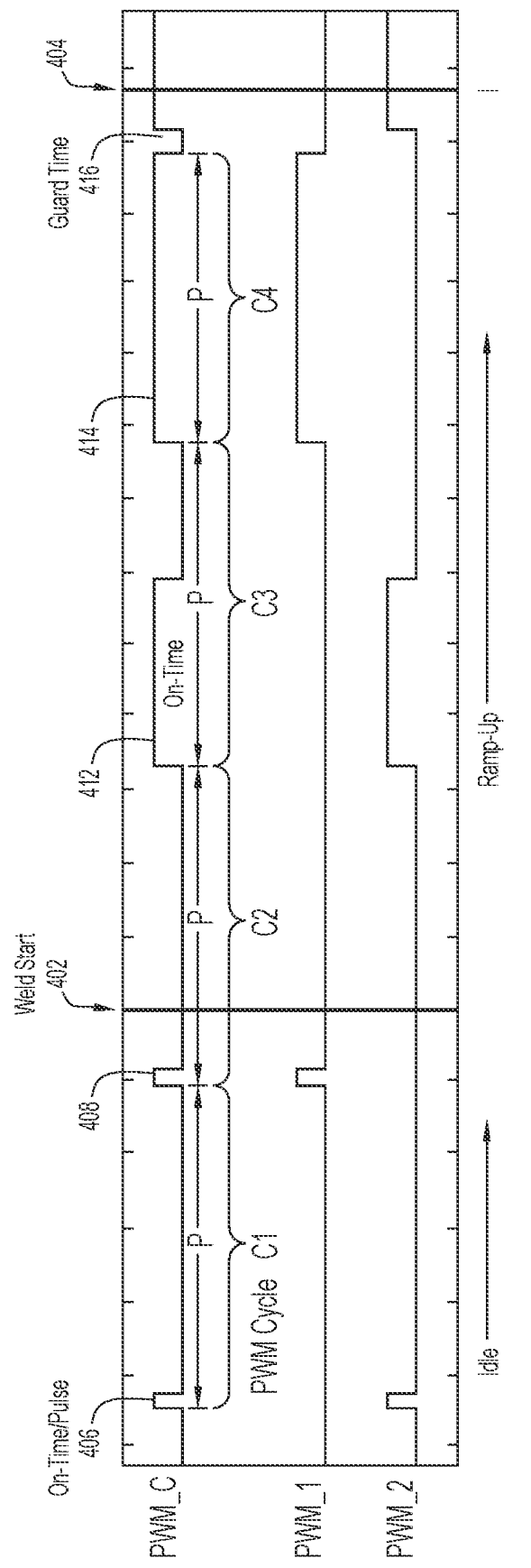
FIG. 4 shows pulse width modulation (PWM) waveforms used to ramp-up weld current after weld start according to a first implementation.

A first implementation of PWM used to ramp-up weld power from weld start (representing a power increase event) is now described in connection with FIGS. 4 and 5. FIG. 4 shows PWM waveforms generated by PSC 104 and applied to inverter 204 to ramp-up weld current from a minimum current beginning at weld start 402 to a current of about 50 amps at 404, over a ramp-up period (i.e., the period of time or duration from 402 to 404) of about 63 microseconds (pec). In other examples, the weld start at 402 may be replaced with a command to increase the AC signal or a change in a state of a weld operation, as discussed above. The weld current ramp-up in the first implementation disadvantageously causes unbalanced magnetization current in transformer 206 across multiple PWM cycles, as will be described in connection with FIG. 5. The PWM waveforms of FIG. 4 include waveforms for PWM_1 and PWM_2, and a composite or combined PWM waveform PWM_C (referred to simply as "PWM_C"), which is a composite or combination of the waveforms for PWM_1 and PWM_2. For example, composite waveform PWM_C may be generated as a logical OR of PWM_1 and PWM_2 and under a constraint that each PWM pulse of PWM_C toggles the direction of the magnetic flux (e.g., via magnetization current) in transformer 206. Thus, PWM_C represents an overall PWM waveform that results from PWM_1 and PWM_2.

Prior to weld start 402, inverter 204 operates in the idle state to generate an idle voltage responsive to PWM cycles C1, C2 each having a low duty cycle to produce on-times (i.e., pulses) 406, 408 of PWM_C each corresponding to the low duty cycle of the PWM cycles. Each of PWM cycles C1, C2 has a period P, where P is equal to the time between rising edges of (consecutive) on-times 406, 408. In the example of FIG. 4, period P is about 22.5 μsec, and each on-time (i.e., the pulse width of each pulse) is about 1 μsec. Thus, the duty cycle of PWM_C is about 5%, and the frequency of PWM_C is about 47 kHz (1/22.5 μsec). Note that the aforementioned values of period, frequency, on-time, and duty cycle are provided by way of example, only. In practice, the on-time/pulse width of each pulse may be less than 1 μsec (e.g., 200 ns), and the duty cycle may be less than 1%, for example.

Upon detection of weld start 402, AC signal (and thus weld current) ramp-up begins. The frequency (and phase) of PWM_C is held constant at 47 kHz (and thus period P is held constant at about 22.5 μsec) throughout the ramp-up period, while the duty cycle is (i) stepped-up to about 40% for a first PWM cycle C3 after weld start 402, to produce an on-time 412 (that starts only after PWM cycle C2 in-progress when weld start 402 is detected completes), and (ii) stepped-up again to a maximum/100% duty cycle for a next cycle C4 to produce an on-time 414. PWM cycles C3 and C4 each maintain period P. The 100% duty cycle is a maximum duty cycle (i.e., that results in a maximum on-time (i.e., pulse width) during a PWM cycle), while incorporating a short guard band 416 (i.e., off-time) between successive PWM cycles. The guard band is configured to allow the switches of inverter 204 to safely transition between ON and OFF responsive to transitions of PWM_1 and PWM_2. A typical guard band may be approximately 1-3 μsec, for example.

Figure 5:
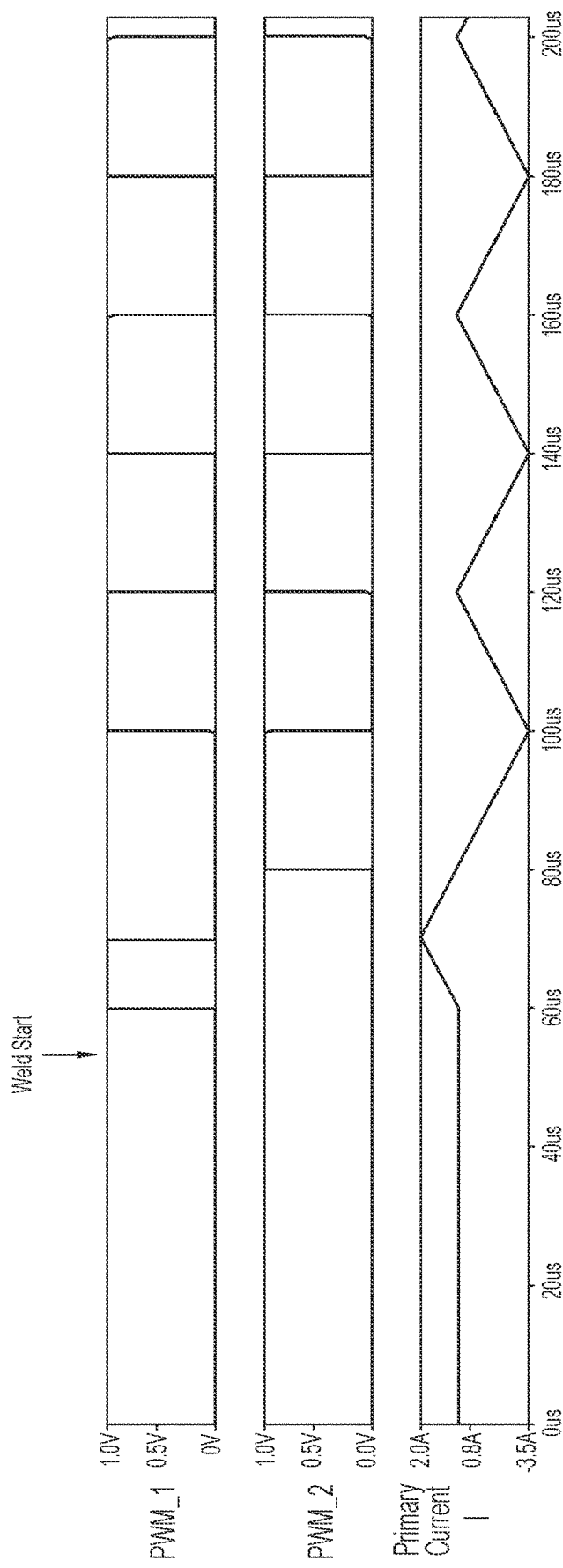
FIG. 5 shows PWM waveforms and an unbalanced current waveform supplied by the power inverter to a transformer of the power supply that occur in the first implementation, according to an example embodiment.

FIG. 5 shows waveforms for PWM_1, PWM_2, and a magnetization current I (also referred to as the "primary current") that flows in input coil IC of transformer 206 as a result of the AC signal from inverter 204 before and after weld start 402, according to the first implementation. The scaling of waveforms in FIG. 5 is different from that used in FIG. 4. In FIG. 5, after weld start, a first cycle of current I rises to 1.8 amps and then falls to −3.6 and is therefore substantially unbalanced or skewed, i.e., asymmetric. The AC signal disadvantageously causes the correspondingly unbalanced magnetization current in the core of transformer 206 across multiple PWM cycles.

The first implementation has several disadvantages. First, it takes a relatively long time to ramp-up the weld current to its maximum time derivative (di/dt) value at 100% duty cycle. Second, the start of the first pulse after weld start is delayed, which reduces current on-time and causes the current ramp-up time to be increased. Third, the current generated by inverter 204 responsive to PWM_C causes unbalanced magnetization current in transformer 206.

Figure 6:
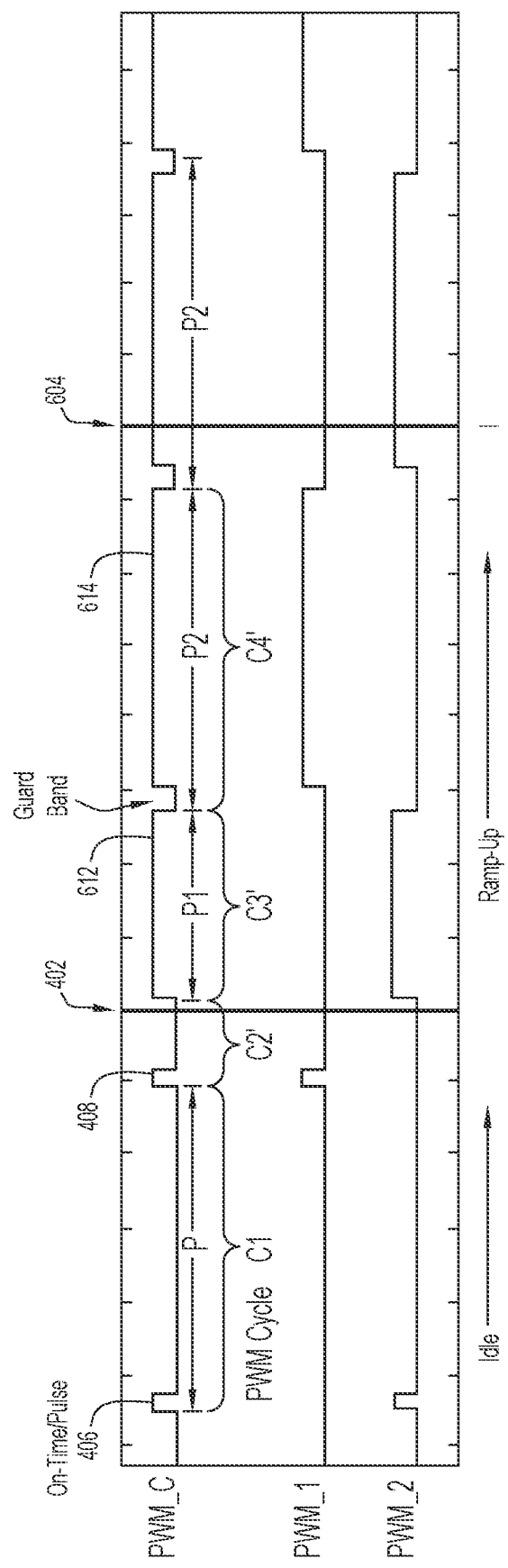
FIG. 6 shows PWM waveforms employed to ramp-up weld current after weld start according to a second implementation that improves upon the first implementation, according to an example embodiment.

To overcome the shortcomings of the first implementation, the embodiment described below advantageously controls inverter 204 to ramp-up weld current from a minimum current at weld start or any other power increase event to a maximum current in a shorter time period than the first implementation described above, while maintaining balanced/symmetrical magnetization current in transformer 206 across multiple PWM cycles. The embodiment is now described by way of example with reference to FIGS. 6 and 7 corresponding to a second implementation. FIG. 6 shows PWM waveforms PWM_1, PWM_2, and their equivalent composite waveform PWM_C generated by PSC 104 and applied to inverter 204 to cause the inverter to ramp-up weld current from a minimum current beginning at weld start 402 (or any other power increase event) to a current of 50 amps at 604, over a shortened ramp-up period of 40 μsec. The shortened ramp-up period of 40 μsec is 36% faster than that in the first implementation described above in connection with FIGS. 4 and 5. The ramp-up in weld current advantageously maintains balanced magnetization current in transformer 206 across multiple PWM cycles.

With continued reference to FIG. 6, prior to weld start 402, inverter 204 operates in the idle state to generate an idle voltage responsive to pre-detection idle on-times 406, 408 in PWM cycles C1, C2 of PWM_C, similar to the first implementation except that cycle C2 is interrupted mid-cycle to produce shortened PWM cycle C2' as depicted in FIG. 6 and described below. As used herein, the terms "idle" and "initial" are interchangeable. As in FIG. 4, idle period P is about 22.5 μsec with idle on-times (i.e., pulse widths) 406, 408 of about 1 μsec each, the idle frequency is about 47 kHz, and the idle duty cycle is about 5%. Note that the aforementioned values of period, frequency (1/period), on-time, and duty cycle are provided by way of example, only. In practice, the on-time may be less than 1 μsec (e.g., 200 ns), and the duty cycle may be less than 1%, for example.

Upon detection of weld start 402, the weld current is ramped-up in two steps, described first in terms of a change in PWM_C period. In a first step, (i) the period of PWM_C is decreased from idle period P to a first period P1 that is about half the idle period, and (ii) a (first) PWM cycle C3' is generated having first period P1 and a first on-time 612 corresponding to a first duty cycle of 100% for the current PWM cycle (i.e., the duty cycle is increased from the idle duty cycle to 100%). PWM cycle C3' interrupts idle PWM cycle C2 at weld start 402, such that first on-time 612 begins immediately after weld start. That is, idle PWM cycle C2 that is in-progress at weld start is terminated early, i.e., without waiting for the in-progress idle PWM cycle to complete, and then PWM cycle C3' (and its on-time 612) is started. Starting PWM cycle C3' without waiting for in-progress idle PWM cycle C2 to complete may result in a phase shift in PWM_C, depending on the time alignment between the in-progress idle PWM cycle and weld start, and can further shorten the ramp-up period.

In a second step, (i) the period of PWM_C is increased from first period P1 to a second period P2 that is approximately double first period P1, and (ii) a (second) PWM cycle C4' is generated having second period P2 and a second on-time 614 corresponding to a second duty cycle of 100% for the current PWM cycle (i.e., the duty cycle is maintained at 100%). The second on-time (i.e., pulse width) 614 is greater than the first on-time (i.e., the pulse width) for 612. PWM cycles C3', C4', and their corresponding on-times 612, 614, are separated in time from each other only by the limited guard band. In the example of FIG. 6, periods P2 and P are equal, but they may be different in other examples. Subsequent successive PWM cycles having second period P2 are generated at 100% duty cycle for those cycles until the desired current is reached.

The two steps described above in terms of period changes may also be described in terms of corresponding frequency changes, as follows. In the first step, the frequency is stepped-up (i.e., increased) from the idle frequency (1/P) to a first frequency (1/P1) that is greater than the idle frequency (e.g., about twice the idle frequency), and (ii) PWM cycle C3' is generated at 100% duty cycle at the first frequency. In the second step, (i) the frequency is stepped-down (i.e., decreased) from the first frequency to a second frequency (1/P2) that is less than the first frequency, and (ii) PWM cycle C4' is generated at 100% duty cycle at the second frequency, which may be the same as the idle PWM frequency, for example.

Figure 7:
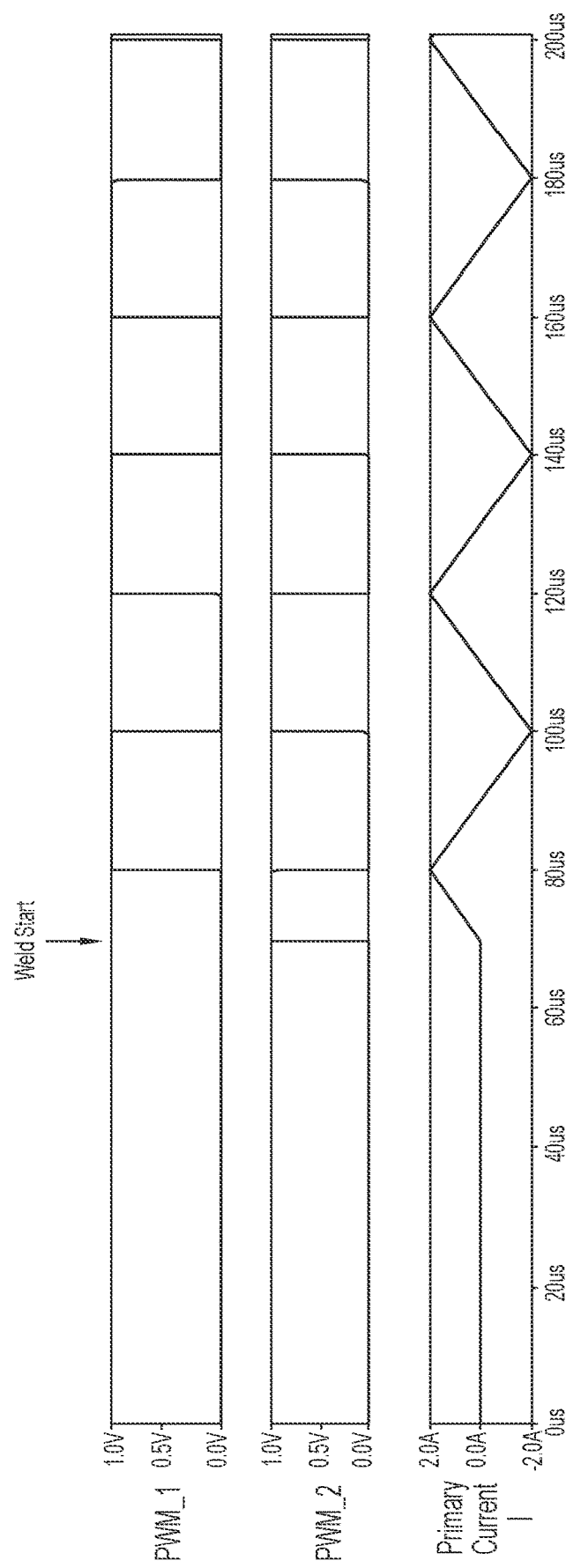
FIG. 7 shows PWM waveforms and a balanced current supplied by the power inverter to the transformer for the second implementation, according to an example embodiment.

FIG. 7 shows waveforms for PWM_1, PWM_2, and magnetization current I in input coil IC of transformer 206 that results from multiple cycles of the AC signal before and after weld start 402, according to the embodiment presented herein. After weld start, each cycle of the magnetization current (waveform) I during current ramp-up swings up to 1.8 amps and then down to −1.8 (i.e., symmetrical positive and negative swings of ±1.8 amps about DC level of zero amps) and is thus balanced or symmetrical about zero amps. Thus, the AC signal advantageously results in balanced symmetry of the magnetization current in transformer 206 across multiple PWM cycles. Therefore, both faster ramp-up of the weld current and improved magnetization current of transformer 206 result. Further, since transformer 206 is balanced after weld start, the embodiment presented herein avoids the need to over-engineer the transformer, which saves considerable cost in the power supply.

In the second implementation, the initial on-time and the initial duty cycle at weld start are low. Therefore, to ramp-up quickly, (i) the first period of the first PWM cycle after weld start is set to half of the initial period, with 100% on-time, and (ii) the second period of the second PWM cycle after weld start is set equal to the initial period, with 100% on-time. In a different example in which the initial on-time at weld start is more substantial (e.g., 50% on-time), then the ramp-up depends on when the power increase event is detected relative to the last initial on-time. For example, when the power increase event is detected during or shortly after the last idle on-time (i.e., idle pulse), then the idle pulse is considered to be the on-time for the first PWM cycle, and the second PWM cycle is generated as described above. Alternatively, when the power increase event is detected well after the idle on-time has transitioned to an idle off-time, then the first on-time of the first PWM cycle depends on a computed primary current still flowing, such that the first on-time will remain on for however long is necessary to counteract the lingering primary current, plus 50%, and the second period of the second PWM cycle will be set to the full initial period, at 100% duty cycle.

FIG. 8 is a flowchart of an example method 800 performed in a welding or cutting system (e.g., 100) having a power inverter (e.g., 204) to generate an AC signal for a welding or cutting operation responsive to a PWM waveform (e.g., PWM_C) that is applied to the power inverter by a controller (e.g., 104) to control the AC signal. The power inverter supplies the AC signal to a transformer. The power inverter may include first current switches (e.g., Q1, Q4) and second current switches (e.g., Q2, Q3) arranged to form an H-bridge inverter. The first current switches and the second current switches are respectively controlled responsive to a first PWM waveform (e.g., PWM_1) and a second PWM waveform (e.g., PWM_2) that together form a composite waveform that represents the PWM waveform. The controller receives a sensed voltage or voltage measurement indicative of a voltage at the welding torch.

Initially, at 802, the controller generates the PWM waveform as an initial PWM waveform to include initial PWM cycles (having an initial frequency, an initial period, an initial duty cycle that is less than 50%, for example, and each having an initial on-time/pulse width corresponding to the initial duty cycle and the initial period). Prior to a welding or cutting operation, the on-times/pulses of the initial PWM cycles cause the power inverter to generate initial voltage pulses but to supply no AC. The initial duty cycle may be zero (in which case there are no initial on-times/pulses) or non-zero (e.g., less than 1% or less than 5%). Alternatively, during a welding or cutting operation while the power inverter operates in a current mode to supply AC, the initial PWM pulses cause the power inverter to generate initial voltage pulses and to supply the AC.

At 804, upon detecting a power increase event (e.g., weld start, a command to increase the AC signal, or a change in state of a welding operation) while the power inverter is generating the initial voltage pulses (and suppling AC for a welding operation when in the current mode), the controller controls the PWM waveform to cause the power inverter to ramp-up (i.e., increase) the AC signal (and thus the weld current) from an initial current level to an increased current level that satisfies the power increase event over multiple (i.e., two or more) consecutive PWM cycles that may start immediately after the power increase event is detected, while maintaining balanced magnetization current in the transformer. For weld start, the controller may detect the weld start as a dip in the sensed voltage caused by momentary contact between the welding torch and a workpiece. For a change in state of an ongoing welding operation, the controller (or power inverter) may detect the change in state as a sudden dip in weld current, for example. The initial current level may be a minimum current level at or near zero prior to welding, or a non-minimum current level supplied during the current mode, for example. On the other hand, the increased current level (e.g., a maximum current level) may be sufficiently high to perform a welding or cutting operation. In summary, detection of the power increase event triggers the increase of the AC signal under control of the PWM waveform so as to maintain the balanced and magnetization current in the transformer. In an example, the controller performs the following operations:

a. The controller generates a first PWM cycle having a first period and a first on-time (i.e., pulse width) corresponding to a first duty cycle of the first PWM cycle that is greater than 50% (e.g., at or near 100%), to cause the power inverter to generate a corresponding first cycle of the AC signal responsive to the first PWM cycle. To implement this, in an example, the controller (i) decreases the period from the initial period to a first period that is less than the initial period (i.e., the initial period is greater than the first period), and (ii) generates the first PWM cycle having the first period and the first on-time corresponding to the first duty cycle. Correspondingly, in terms of frequency, the controller (i) steps-up the frequency from the initial frequency to a stepped-up frequency, and (ii) generates the first PWM cycle at the stepped-up frequency and the first duty cycle. Thus, the controller decreases the period, increases the frequency, increases the duty cycle, and increases the on-time relative to their corresponding values in the initial stage. The first on-time starts immediately after the power increase event is detected to minimize off-time between the power increase event and a start of the first on-time.

b. The controller generates a second PWM cycle having a second period that is greater than the first period and a second on-time (i.e., pulse width) corresponding to a second duty cycle of the second PWM cycle that is greater than 50% (e.g., at or near 100%), to cause the power inverter to generate a second cycle of the AC signal responsive to the second PWM cycle. In an example, the second on-time (i.e., pulse width) is greater than the first on-time (i.e., pulse width), and the first duty cycle and the second duty cycle are each 100%. To implement this, in an example, the controller (i) increases the period from the first period to the second period, and immediately after the first PWM cycle (plus a guard band), (ii) generates the second PWM cycle having the second period and the second on-time corresponding to the second duty cycle. Correspondingly, in terms of frequency, the controller (i) steps-down the frequency from the stepped-up frequency to a stepped-down frequency, and (ii) generates the second PWM cycle at the stepped-down frequency and the second duty cycle. In an example, the first and second duty cycles are equal. In another example, the first and second duty cycles are not equal. In yet another example, the initial duty cycle is less than each of the first duty cycle and the second duty cycle.

The controller maintains the characteristics/parameters of second PWM cycle (b) for successive PWM cycles during an ongoing welding or cutting operation. The AC signal that results from the first and second PWM cycles is balanced, i.e., has symmetrical positive and negative successive half-cycles, and produces balanced magnetization current in the transformer.

Figure 9:
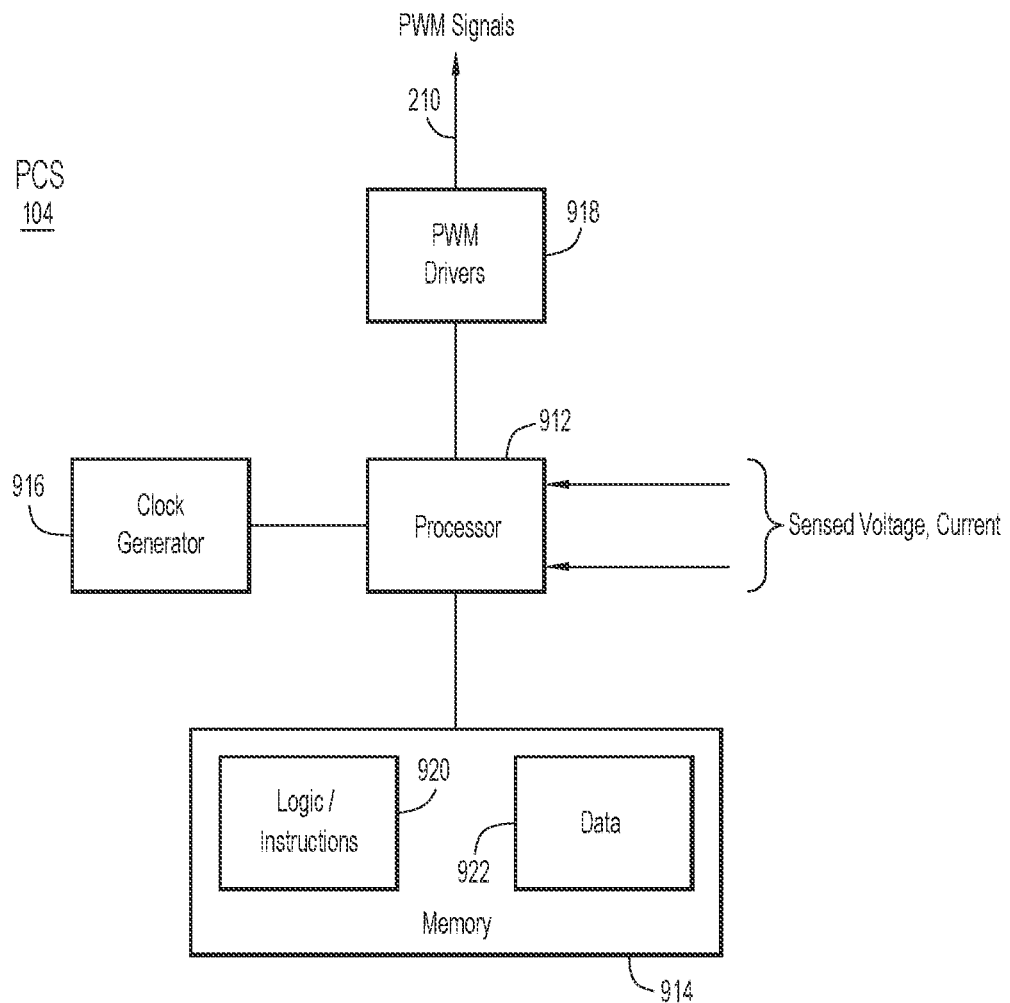
FIG. 9 is a block diagram of the PSC, according to an example embodiment.

With reference to FIG. 9, there is an block diagram of PSC (also referred to as "controller") 104, according to an embodiment. PSC 104 includes a processor or microcontroller 912, a memory 914, a clock generator 916, and PWM drivers 918 coupled with each other. PSC 104 receives sensed voltage and current, and generates PWM waveforms 210 using PWM drivers 918. Memory 914 stores non-transitory computer readable program instructions/logic instructions 920 that, when executed by processor 912, cause the controller to perform the operations described herein. For example, memory 914 may store program instructions that executed/control power increase event triggered ramp-up/increase of the AC signal. Memory 914 also stores data 922 used and produced by processor 912. Clock generator 916 generates clocks and timing signals used to drive other components of PSC 104. In embodiments, components of PSC 104 may include electronic circuitry such as, for example, programmable logic circuitry, field-programmable gate arrays (FPGA), or In some aspects, the techniques described herein relate to a method performed in a welding or cutting system having a power inverter to generate an alternating current (AC) signal responsive to pulse width modulation (PWM) that is applied to the power inverter to control the AC signal, including: upon detecting a power increase event in the welding or cutting system that necessitates an increase in the AC signal, controlling the PWM to cause the power inverter to increase the AC signal over multiple PWM cycles by: generating a first PWM cycle having a first period and a first on-time corresponding to a first duty cycle of the first PWM cycle that is greater than 50%; and generating a second PWM cycle having a second period that is greater than the first period and a second on-time corresponding to a second duty cycle of the second PWM cycle that is greater than 50%.

In some aspects, the techniques described herein relate to a method, wherein the second on-time is greater than the first on-time.

In some aspects, the techniques described herein relate to a method, wherein the first duty cycle and the second duty cycle are each 100%.

In some aspects, the techniques described herein relate to a method, wherein: generating the first PWM cycle includes starting the first on-time of the first PWM cycle immediately after detecting the power increase event to minimize PWM off-time after detecting the power increase event.

In some aspects, the techniques described herein relate to a method, wherein the first PWM cycle and the second PWM cycle are consecutive and the first on-time and the second on-time are separated in time by a guard-band off-time of the PWM to allow for switching of power switches in the power inverter.

In some aspects, the techniques described herein relate to a method, wherein: the power inverter is configured to supply the AC signal to a transformer; and generating the first PWM cycle and generating the second PWM cycle causes the power inverter to increase the AC signal for a welding or cutting operation, while the AC signal maintains a balanced magnetization current in the transformer across the multiple PWM cycles.

In some aspects, the techniques described herein relate to a method, wherein: the multiple PWM cycles produce multiple magnetization current cycles that each has symmetrical positive and negative swings about a direct current (DC) level.

In some aspects, the techniques described herein relate to a method, wherein: detecting further includes detecting the power increase event while the PWM has a period set to an initial period that is greater than the first period.

In some aspects, the techniques described herein relate to a method, wherein the second period is equal to the initial period.

In some aspects, the techniques described herein relate to a method, wherein: the power inverter includes a four-quadrant inverter having a first quadrant, a second quadrant, a third quadrant, and a fourth quadrant; and controlling includes controlling (i) the first quadrant and the fourth quadrant, and (ii) the second quadrant and the third quadrant, respectively, with a first PWM waveform and a second PWM waveform that together form a composite waveform that represents the PWM.

In some aspects, the techniques described herein relate to a method, wherein the power increase event includes a weld start that occurs before a welding or cutting operation or an event that occurs during a welding or cutting operation.

In some aspects, the techniques described herein relate to an apparatus including: a power inverter of a welding or cutting system and configured to generate an alternating current (AC) signal responsive to pulse width modulation (PWM) that controls the AC signal; and a controller configured to perform, upon detecting a power increase event in the welding or cutting system that necessitates an increase in the AC signal, controlling the PWM to cause the power inverter to increase the AC signal over multiple PWM cycles by: generating a first PWM cycle having a first period and a first on-time corresponding to a first duty cycle of the first PWM cycle that is greater than 50%; and generating a second PWM cycle having a second period that is greater than the first period and a second on-time corresponding to a second duty cycle of the second PWM cycle that is greater than 50%.

In some aspects, the techniques described herein relate to an apparatus, wherein the second on-time is greater than the first on-time.

In some aspects, the techniques described herein relate to an apparatus, wherein the first duty cycle and the second duty cycle are each 100%.

In some aspects, the techniques described herein relate to an apparatus, wherein: The controller is configured to perform generating the first PWM cycle by starting the first on-time of the first PWM cycle immediately after detecting the power increase event to minimize PWM off-time after detecting the power increase event.

In some aspects, the techniques described herein relate to an apparatus, wherein the first PWM cycle and the second PWM cycle are consecutive and the first on-time and the second on-time are separated in time by a guard-band off-time of the PWM to allow for switching of power switches in the power inverter.

In some aspects, the techniques described herein relate to an apparatus, wherein: the power inverter is configured to supply the AC signal to a transformer; and the controller is configured to perform generating the first PWM cycle and generating the second PWM cycle to cause the power inverter to increase the AC signal for a welding or cutting operation, while the AC signal maintains a balanced magnetization current in the transformer across the multiple PWM cycles.

In some aspects, the techniques described herein relate to an apparatus, wherein: the multiple PWM cycles produce multiple magnetization current cycles that each has symmetrical positive and negative swings about a direct current (DC) level.

In some aspects, the techniques described herein relate to an apparatus, wherein: The controller is configured to perform detecting by detecting the power increase event while the PWM has a period set to an initial period that is greater than the first period.

In some aspects, the techniques described herein relate to an apparatus, wherein: the power inverter includes a four-quadrant having a first quadrant, a second quadrant, a third quadrant, and a fourth quadrant; and the controller is configured to perform controlling by controlling (i) the first quadrant and the fourth quadrant, and (ii) the second quadrant and the third quadrant, respectively, with a first PWM waveform and a second PWM waveform that together form a composite waveform that represents the PWM. 1. 2. programmable logic arrays (PLA) to execute the computer readable program instructions, which may include microcode, firmware, and so on.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed in a welding or cutting system having a power inverter to generate an alternating current (AC) signal responsive to pulse width modulation (PWM) that is applied to the power inverter to control the AC signal, comprising:

upon detecting a power increase event in the welding or cutting system that necessitates an increase in the AC signal, controlling the PWM to cause the power inverter to increase the AC signal over consecutive PWM cycles by:
generating a first PWM cycle having a first period and a first on-time corresponding to a first duty cycle of the first PWM cycle that is greater than 50%; and
immediately after the first PWM cycle, generating a second PWM cycle having a second period that is greater than the first period and a second on-time that is greater than the first on-time and that corresponds to a second duty cycle of the second PWM cycle that is greater than 50%.

2. The method of claim 1, wherein the first duty cycle and the second duty cycle are each 100%.

3. The method of claim 1, wherein:
generating the first PWM cycle includes starting the first on-time of the first PWM cycle immediately after detecting the power increase event to minimize PWM off-time after detecting the power increase event.

4. The method of claim 1, wherein the first PWM cycle and the second PWM cycle are consecutive and the first on-time and the second on-time are separated in time by a guard-band off-time of the PWM to allow for switching of power switches in the power inverter.

5. The method of claim 1, wherein:
the power inverter is configured to supply the AC signal to a transformer; and
generating the first PWM cycle and generating the second PWM cycle causes the power inverter to increase the AC signal for a welding or cutting operation, while the AC signal maintains a balanced magnetization current in the transformer across the consecutive PWM cycles.

6. The method of claim 5, wherein:
the consecutive PWM cycles produce multiple magnetization current cycles that each has symmetrical positive and negative swings about a direct current (DC) level.

7. The method of claim 1, wherein:
detecting further includes detecting the power increase event while the PWM has a period set to an initial period that is greater than the first period.

8. The method of claim 7, wherein the second period is equal to the initial period.

9. The method of claim 1, wherein:
the power inverter includes a four-quadrant inverter having a first quadrant, a second quadrant, a third quadrant, and a fourth quadrant; and controlling includes controlling (i) the first quadrant and the fourth quadrant, and (ii) the second quadrant and the third quadrant, respectively, with a first PWM waveform and a second PWM waveform that together form a composite waveform that represents the PWM.

10. The method of claim 1, wherein the power increase event includes a weld start that occurs before a welding or cutting operation or an event that occurs during a welding or cutting operation.

11. An apparatus comprising:
a power inverter of a welding or cutting system and configured to generate an alternating current (AC) signal responsive to pulse width modulation (PWM) that controls the AC signal; and
a controller configured to perform, upon detecting a power increase event in the welding or cutting system that necessitates an increase in the AC signal, controlling the PWM to cause the power inverter to increase the AC signal over consecutive PWM cycles by:
generating a first PWM cycle having a first period and a first on-time corresponding to a first duty cycle of the first PWM cycle that is greater than 50%; and
immediately after the first PWM cycle, generating a second PWM cycle having a second period that is greater than the first period and a second on-time that is greater than the first on-time and that corresponds to a second duty cycle of the second PWM cycle that is greater than 50%.

12. The apparatus of claim 11, wherein the first duty cycle and the second duty cycle are each 100%.

13. The apparatus of claim 11, wherein:
The controller is configured to perform generating the first PWM cycle by starting the first on-time of the first PWM cycle immediately after detecting the power increase event to minimize PWM off-time after detecting the power increase event.

14. The apparatus of claim 11, wherein the first PWM cycle and the second PWM cycle are consecutive and the first on-time and the second on-time are separated in time by a guard-band off-time of the PWM to allow for switching of power switches in the power inverter.

15. The apparatus of claim 11, wherein:
the power inverter is configured to supply the AC signal to a transformer; and
the controller is configured to perform generating the first PWM cycle and generating the second PWM cycle to cause the power inverter to increase the AC signal for a welding or cutting operation, while the AC signal maintains a balanced magnetization current in the transformer across the consecutive PWM cycles.

16. The apparatus of claim 15, wherein:
the consecutive PWM cycles produce multiple magnetization current cycles that each has symmetrical positive and negative swings about a direct current (DC) level.

17. The apparatus of claim 11, wherein:
The controller is configured to perform detecting by detecting the power increase event while the PWM has a period set to an initial period that is greater than the first period.

18. The apparatus of claim 11, wherein:
the power inverter includes a four-quadrant having a first quadrant, a second quadrant, a third quadrant, and a fourth quadrant; and
the controller is configured to perform controlling by controlling (i) the first quadrant and the fourth quadrant, and (ii) the second quadrant and the third quadrant, respectively, with a first PWM waveform and a second PWM waveform that together form a composite waveform that represents the PWM.

\* \* \* \* \*